United States Patent [19]
Bush

[11] 3,868,796
[45] Mar. 4, 1975

[54] SIDE DOOR INTRUSION PROTECTION

[75] Inventor: George F. Bush, Detroit, Mich.

[73] Assignee: Ford Motor Company, Dearborn, Mich.

[22] Filed: Apr. 4, 1973

[21] Appl. No.: 347,960

[52] U.S. Cl. .................. 52/618, 52/309, 296/146
[51] Int. Cl. ............................................. E04c 2/38
[58] Field of Search ............... 52/618; 49/501, 502; 296/146, 76, 137 R

[56] References Cited
UNITED STATES PATENTS

| | | | |
|---|---|---|---|
| 2,125,761 | 8/1938 | Westrope | 296/76 |
| 2,298,001 | 10/1942 | Fay | 52/618 |
| 3,200,026 | 8/1965 | Brown | 52/309 |
| 3,314,196 | 4/1967 | Betz | 49/501 |
| 3,368,473 | 2/1968 | Yoshitoshi Sohda | 52/618 |
| 3,449,881 | 6/1969 | Wilfert | 296/146 |
| 3,555,756 | 1/1971 | Curran | 52/618 |
| 3,583,123 | 6/1971 | Holmgren | 52/618 |

FOREIGN PATENTS OR APPLICATIONS

| | | | |
|---|---|---|---|
| 1,189,810 | 4/1970 | Great Britain | 49/502 |
| 63,948 | 10/1945 | France | 296/146 |
| 1,959,988 | 6/1971 | Germany | 49/502 |
| 1,085,891 | 10/1967 | Great Britain | 296/146 |

*Primary Examiner*—Frank L. Abbott
*Assistant Examiner*—Henry E. Raduazo
*Attorney, Agent, or Firm*—Joseph W. Malleck; Keith L. Zerschling

[57] ABSTRACT

A composite beam for rendering side impact protection to a door of an automobile. The conventional outer skin or panel of the door is integrated as part of a beam; an inner corrugated panel is welded at opposite edges to the outer panel and the void therebetween is filled with foam in a manner to provide a surface to surface bond between the panels to complete said beam.

2 Claims, 3 Drawing Figures

PATENTED MAR 4 1975  3,868,796
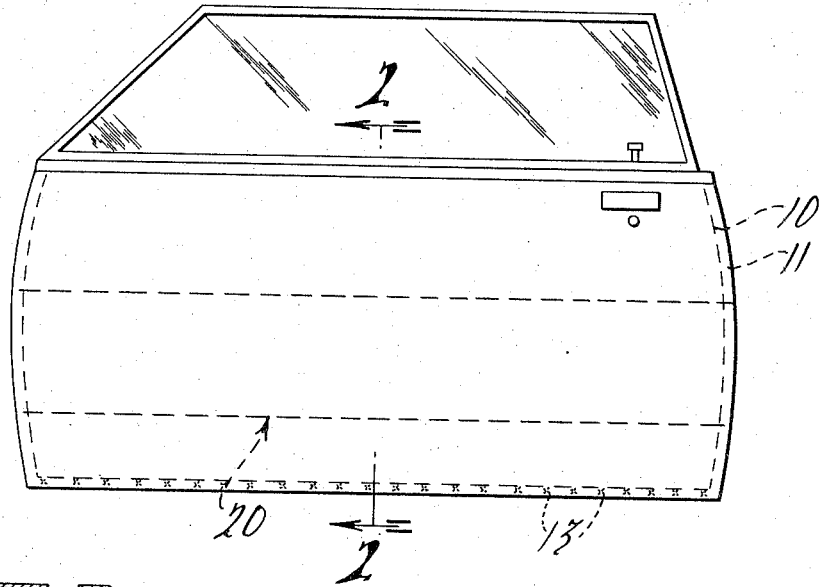
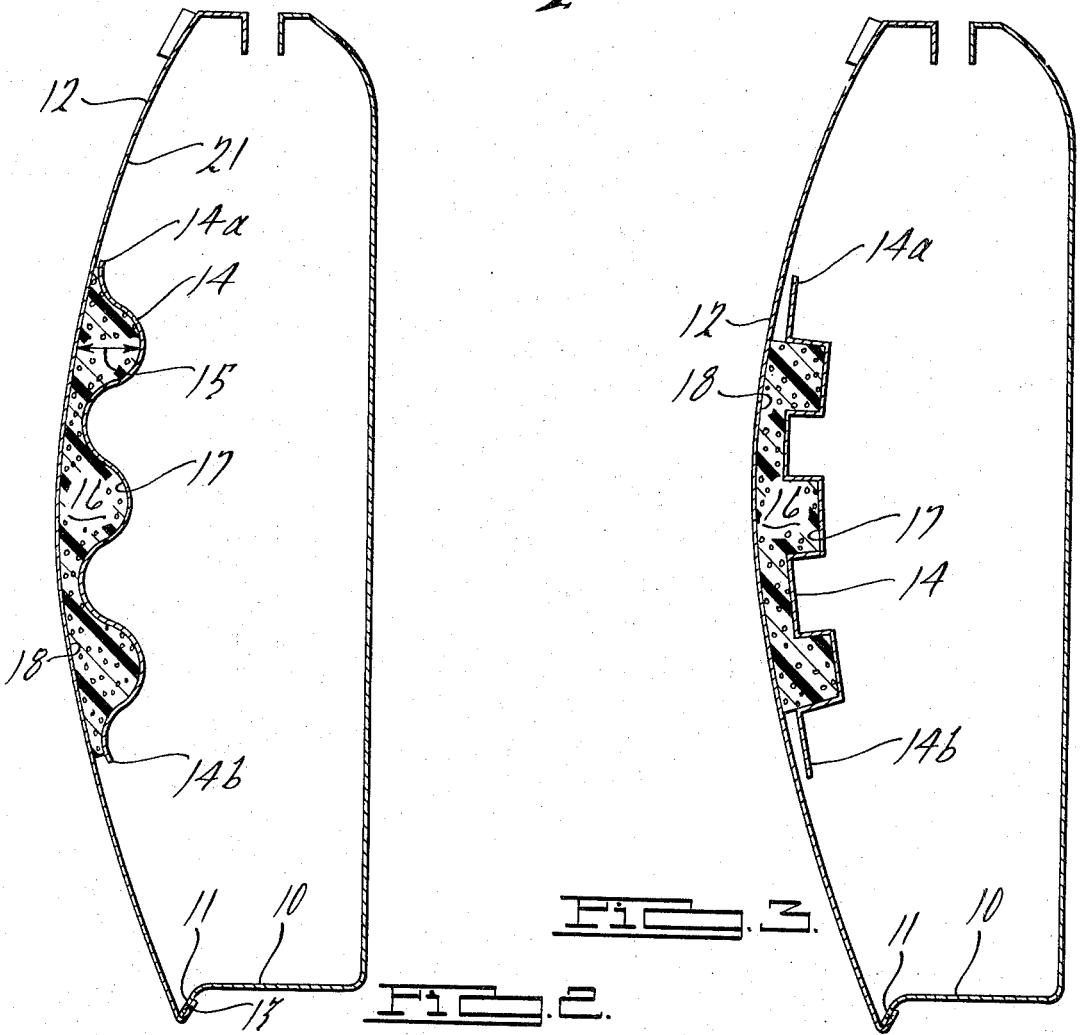

SIDE DOOR INTRUSION PROTECTION

BACKGROUND OF THE INVENTION

Impact protection has become of prime importance to the automotive industry. Independent beams have been employed in a manner to prevent deep penetration of an impacting vehicle into the passenger space of an impacted vehicle. Such independent beams have usually taken the form of a convoluted strip of sheet steel spanning a generally mid-section of the door as well as bisecting interior door space; the beam is rigidly attached (such as by welding) to the opposite portions of a door frame. Since impact forces may be quite high, the beams have been generally made of moderate guage high strength steel.

However, certain drawbacks surround the use of such known beams, some of which are: (a) the obstruction of space within the interior of the door so that the variety of mechanisms and wiring to be installed therein are hindered as to location, and (b) the weight of the beams have adversely increased the overall weight of the vehicle.

SUMMARY OF THE INVENTION

A primary object of this invention is to provide side impact resistance for a door, particularly for an automotive vehicle, by means of integrating the conventional outer skin or panel of such door into a composite beam for effecting such resistance.

Still another object of this invention is to provide enhanced impact resistance for a door which achieves such object without substantially interrupting the interior space of said door and at the same time provide such resistance at less cost and less additional weight to the vehicle.

Yet still another object is to provide side impact resistance for a door by way of a composite structure which at the same time provides for sound absorption and provides less hindrance to freedom of design in hinging the door.

SUMMARY OF THE DRAWINGS

FIG. 1 is an elevational view of a typical automotive door illustrating the general location of the composite beam for side impact resistance of this invention;

FIG. 2 is an enlarged sectional view taken substantially along line 2—2 of FIG. 1, and FIG. 3 is an alternative arrangement similar to the view of FIG. 2.

DETAILED DESCRIPTION

Side guard door beams (or more recently known as intrusion beams) have become critical structures on recent automobiles. The government is promulgating even more stringent side crash specifications thereby requiring enhanced side impact resistance. The presently known beams and those commercially used would not be acceptable to the more stringent specifications because they will unexpectedly buckle under certain of the high impact tests. Accordingly, present automakers are desirous of providing enhanced impact resistance by a structure which offers greater strength while at the same time it is reduced in weight and occupies less of the interior space of the door.

To meet all of these conflicting goals, the present invention proposes to provide a steel and foam composite adapted to increase side impact resistance because the beam will not destruct similar to a conventional instrusion beam.

As shown in FIG. 1, a typical automotive door construction comprises a stamped sheet metal frame 10 formed integral with the inner skin and having a peripheral flange 11 lying substantially transverse to an axis of said frame; the flange extends about the periphery of the inner skin and an outer skin or panel 12 of the door is mounted thereto such as by welding. The outer door panel may be formed of thin guage, cold rolled sheet steel with a stamped configuration as shown in FIG. 2 in cross-section. The outer panel 12 is welded to the peripheral flange at suitable circumferential locations 13 to provide sufficient rigidity. At an intermediate height location, an inner panel 14 of cold rolled sheet steel (preferably 0.031 inch thick as opposed to 0.057 inch as used in prior art constructions) is employed to act in concert with the outer skin 12 of the door; upper and lower edges 14a and 14b or side edges may be welded to the interior of the outer panel 12, but this is optional since bonding of the inner panel may be effected by the foam core to be described. The inner panel has a particular corrugated configuration as shown in FIG. 2, which increases the effective thickness of the sheet steel. Accordingly, strength is increased as a function of its thickness; the rigidity of the beam is directly proportional to the cube of its thickness. With the present construction such a corrugated thickness can be less pronounced due to enhanced strength which is derived from the composite construction rather than purely the metal material.

Urethane foam, in fluid condition, is forced into the void or space 15 defined between the inner and outer panels while they are clamped. When firm, the urethane foam provides a core 16 which strongly bonds the surfaces 17 and 18 facing the interior void. Through the medium of the foam core 16, the inner and outer panels are joined to form an intrusion beam 20.

Since the intrusion beam 20 is disposed to one side 21 of the interior of the door panel, the space required for such beam is highly reduced and is less obtrusive to the containment of other apparatus and electrical equipment.

Although the embodiment of FIG. 2 is illustrated with respect to urethane foam employed as an intermediate mechanism between two metallic panels, it is comprehended within the scope of this invention that a central beam member can be encapsulated in foam or plastic, the latter encapsulated member then being placed within a hollow conventional beam structure of sheet metal. A striking performance characteristic results from this invention in that the composite beam no longer tends to crumble as the conventional beams do, but rather bends with rather accurate predictability. The foam filled structural component will deform with almost mathematical predictability. Energy adsorption can be determined by a simple analysis of cross-sectional dimension, metal thickness and foam density.

It is preferable that the foam be of the rigid urethane type.

Some advantages of such a composite side intrusion beam is that there is a low production cost, the composite beam is light in weight considering its strength level, there is an inherent noise dampening effect, the inner coated walls are protected additionally against corrosion, and there is greater ease of automating the assembly production of such structures.

I claim:
1. A reinforced door panel construction, comprising:
    a. an annular frame having a peripheral flange lying substantially transverse to an axis of said frame and forming a mounting surface,
    b. an outer door panel secured to said flange at least at circumferentially spaced locations of said flange,
    c. a convoluted inner panel secured to said outer panel at least at two opposite edges thereof, said inner panel being formed from high strength cold-rolled steel having a strength level at least 90,000 ksi, the convolutions of said inner panel have a height no greater than three times the minimum thickness of said foam separating said panels, and each panel being formed of thin gauge sheet material no greater in thickness than 0.031, and
    d. a rigid foam core effective to substantially occupy the entire space between said inner and outer panels and effective to provide the sole surface to surface bond between said panels, said panel and foam composite gradually deforming under load without abrupt crumbling.
2. A reinforced door panel construction, as in claim 1, in which said inner panel is peripherally secured to said outer panel at circumferentially spaced locations by welding.

* * * * *